United States Patent [19]

Yang

[11] Patent Number: 4,991,917
[45] Date of Patent: Feb. 12, 1991

[54] HOLOGRAPHIC SCANNING SYSTEM FOR LASER PRINTER

[75] Inventor: Keung Y. Yang, Seoul, Rep. of Korea

[73] Assignee: Goldstar Co., Ltd., Seoul, Rep. of Korea

[21] Appl. No.: 413,201

[22] Filed: Sep. 27, 1989

[30] Foreign Application Priority Data

Sep. 30, 1988 [KR] Rep. of Korea ............... 12857/1988

[51] Int. Cl.$^5$ ............... G02B 5/32; G02B 26/10
[52] U.S. Cl. ............... 350/3.71; 350/3.72; 350/6.2
[58] Field of Search ............... 350/3.7, 3.71, 3.72, 350/3.65, 3.73, 6.7, 6.8, 6.2, 6.3

[56] References Cited

U.S. PATENT DOCUMENTS

| 4,076,372 | 2/1978 | Pole et al. | 350/3.71 |
| 4,113,343 | 9/1978 | Pole et al. | 350/3.71 |

FOREIGN PATENT DOCUMENTS

| 55-73015 | 6/1980 | Japan | 350/3.71 |
| 56-17318 | 2/1981 | Japan | 350/3.71 |
| 56-24313 | 3/1981 | Japan | 350/3.71 |
| 63-18321 | 1/1988 | Japan | 350/3.71 |

Primary Examiner—Bruce Y. Arnold
Assistant Examiner—Martin Lerner
Attorney, Agent, or Firm—Birch, Stewart, Kolasch & Birch

[57] ABSTRACT

A laser scanning system for a laser printer comprises a hologram scanner for scanning and focusing a laser beam and a convex lens for compensating the focusing locus of the laser beam into a straight line and for making the scanning speed uniform, whereby the whole construction of the system is simple in construction and the cost becomes low.

6 Claims, 3 Drawing Sheets

HOLOGRAPHIC SCANNING SYSTEM FOR LASER PRINTER

BACKGROUND OF THE INVENTION

The present invention relates to a holographic scanning system for a laser printer.

Conventional laser printer is composed of a laser beam scanning unit which scans a laser beam, a computer which controls the laser beam scanning unit so as to output a laser beam in accordance with the contents to be printed, and a printing unit which forms a picture on a sensitive drum in accordance with the laser beam being applied from the laser beam scanning unit.

Such a conventional type laser printer is illustrated in FIG. 1 and FIG. 2. In the drawings, reference numeral 1 is a laser beam scanning unit, 10 represents a printing unit and 24 represents a computer. The laser beam scanning unit 10 comprises a laser 2 which generates a laser beam, a collimator 3 which converts the laser beam into a parallel beam, a cylindrical lens 4 which focuses the parallel beam passed through the collimator 3 on a rotary polyhedron 5, compensating lenses 7 and 8 which compensate the laser beam reflected by the rotary polyhedron 5 so as to be precisely formed on a drum 11, and a reflective mirror 9 which deflects the laser beams passed through the compensating lenses toward the drum 11.

The rotary polyhedron 5 is rotated by the driven force of a drive motor 6, and each of the compensating lenses 7 and 8 has at least one toric surface.

The printing unit 10 comprises a sensitive drum 11 on which the laser beam which is applied from the laser beam scanning unit 1, is formed, an electrifier 12, a development counter 13, a transfer printer 14, a separator 15, an electricity remover 16, a fixing heater 17, a cleaner 18, and paper feeding, transferring and discharging means. The paper feeding, transferring and discharging means comprise a cassette 19, feeding rolls 20, discharging rolls 21, and a discharging tray 22.

In the drawing, reference numeral 1' is a housing of laser beam scanning unit 1, and 23 represents a paper transferring guide.

In such a conventional laser printer, a laser beam 1 is generated in accordance with the picture signal from the computer 24 while the laser 2 turns on and off, the laser beam 1 is converted into a parallel beam by the beam collimator 3 and focused onto the mirror surface of the rotary polyhedron 4 by the cylindrical lens 4.

The laser beam focused on the rotary polyhedron 5 is reflected at various angles according as the rotary polyhedron is rotated by the driving force of the drive motor 6, and scanned toward the direction of arrow in FIG. 2 through the compensating lenses 7 and 8, and then these laser beams are deflected by the reflective mirror 9 and focused onto the drum 11.

In the above, the compensating lenses 7 and 8 are adapted to compensate the focusing locus of the laser beam into a straight line when the laser beam is focused and scanned on the drum 11, and also to compensate the slight movement of the laser beam in the vertical direction by the vibration of the rotary polyhedron 5 during its rotation or when the mirror surface of the rotary polyhedron 5 is tilted.

After the laser beam is formed on the drum 11 as a picture, the printing is carried out by well-known printing process.

However, in such a conventional laser printer, there has been some problems in that since it is difficult to manufacture the toric lenses and cylindrical lenses, the cost becomes high and the productivity becomes low.

SUMMARY OF THE INVENTION

It is an object of the present invention to provide a laser beam scanning system which has a simple construction with lower cost by adopting a hologram scanner which is possible to be mass produced than the conventional rotary polyhedron, and a compensating convex lens which has lesser price than the conventional toric lens.

To attain the above object, the laser beam scanning system according to the present invention is structured such that a hologram scanner in which at least one hologram is fixed on a rotary disc so as to make circular, is constituted, the laser beam emitted from a laser is incident upon the holograms of the hologram scanner through a collimator and a reflective mirror, and the laser beam passed through the holograms is incident upon a drum through the compensating convex lens and reflective mirror.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE INVENTION

Figure 1:
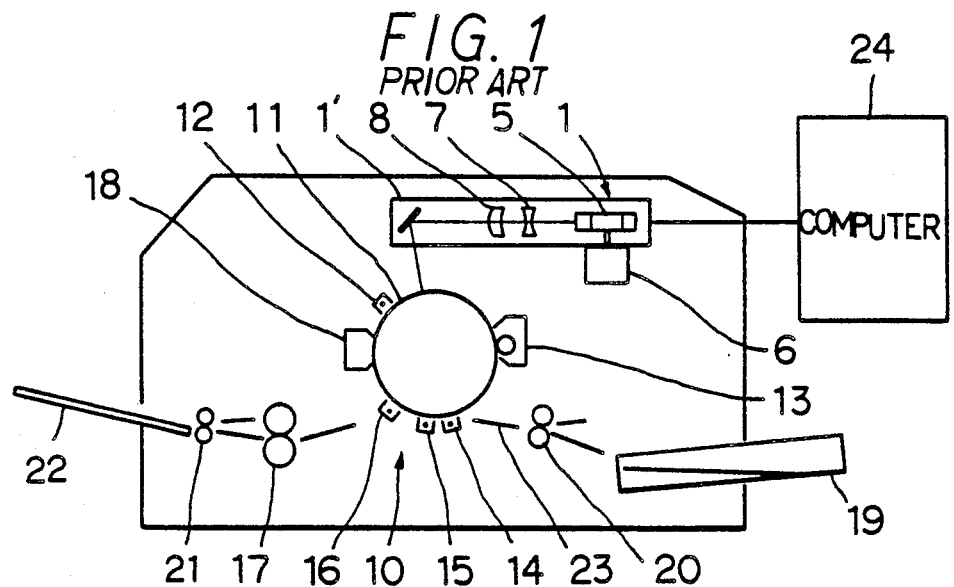
FIG. 1 is a schematic cross-sectional view illustrating a conventional laser printer.
Figure 2:
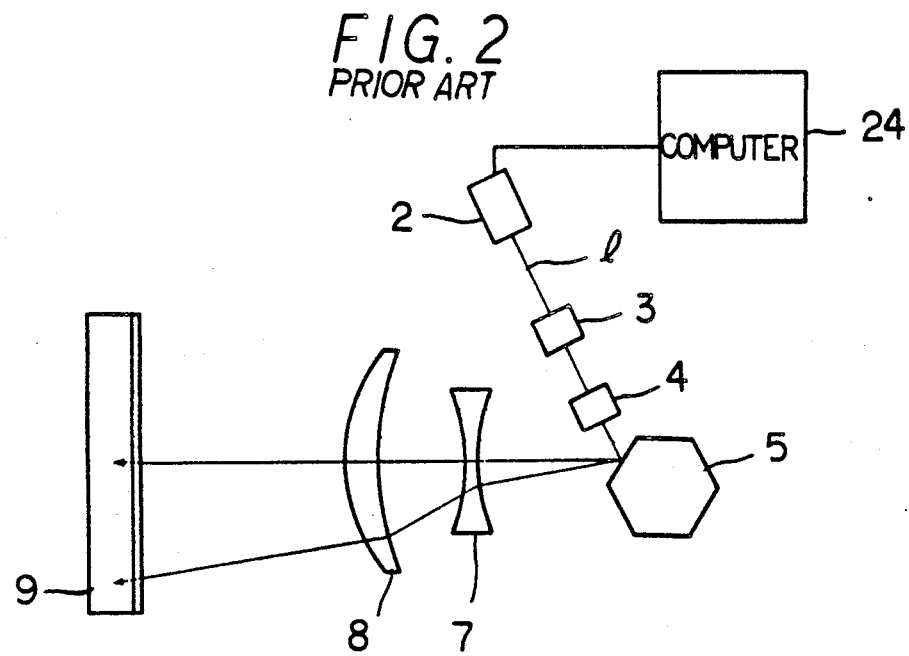
FIG. 2 is a plan view illustrating a laser beam scanner of FIG. 1.
Figure 3:
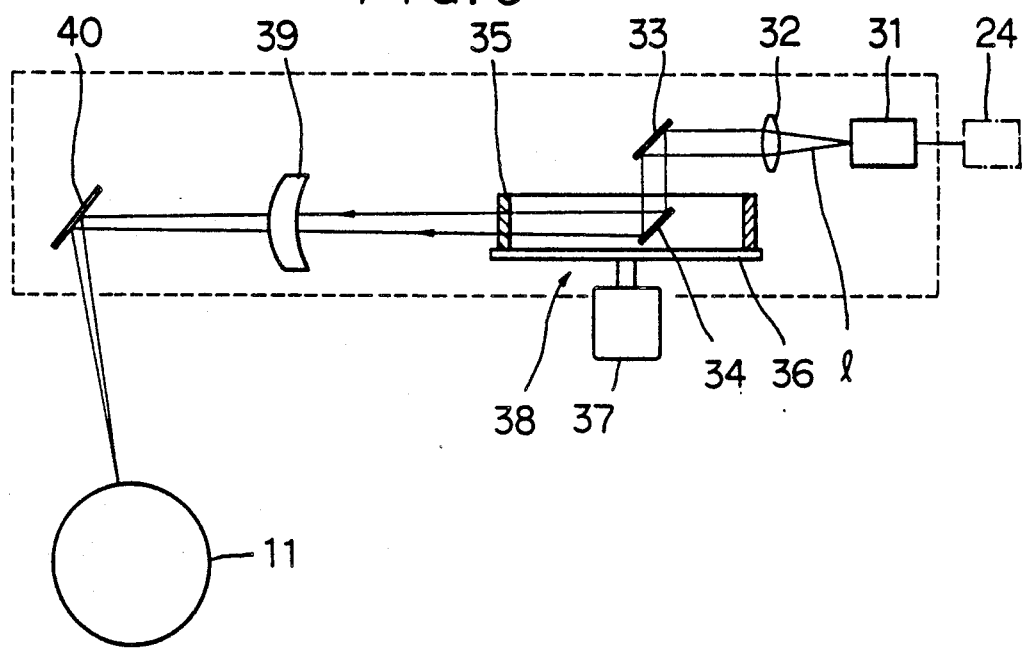
FIG. 3 is a schematic cross-sectional view illustrating a laser beam scanner of the present invention.
Figure 4:
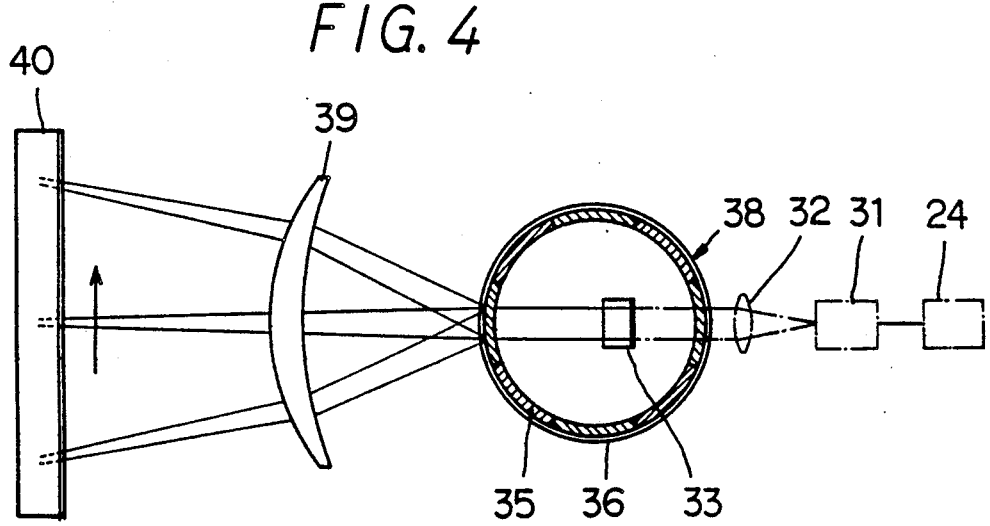
FIG. 4 is a plan view of FIG. 3.

Referring to FIGS. 3 and 4, the laser beam scanning system of the present invention comprises a laser 31 such as a laser diode which generates a laser beam, a collimator 32 which converts the laser beam 1 emitted from the laser 31 into a parallel beam, a hologram scanner 38 which focuses and rotates the parallel beam, means for deflecting the laser beam passed through the collimator 32 so as to be incident upon the hologram scanner 38, means for compensating the laser beam passed through the hologram scanner 38 so as to be scanned straight on the drum 11, and a reflective mirror 40 which deflects the laser beam passed through the compensating means so as to be incident upon the drum 11.

Figure 5A:
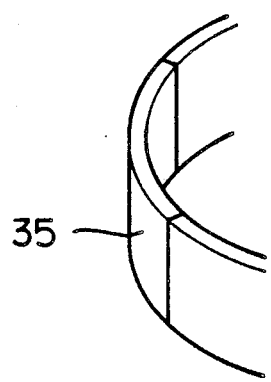
FIG. 5A is a partial perspective view illustrating a hologram of the present invention.
Figure 5B:
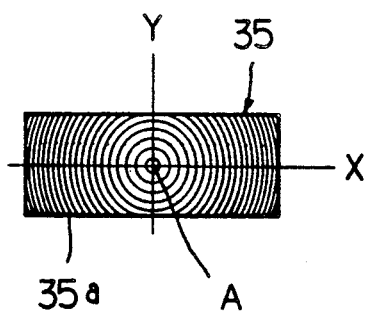
FIG. 5B is an explanatory view of an interference pattern of the hologram.

The hologram scanner 38 is disposed in a hologram scanner housing (not shown) and constituted in such that at least one hologram 35 which focuses and rotates the parallel beam is fixed on the rotary disc 36 in the cylindrical form, as shown in FIG. 5A, the rotary disc 36 is designed to be rotated by a drive means, and the hologram 35 has a number of circular interference patterns 35a centering around the central point "A".

The means for deflecting comprises a first reflective mirror 33 and a second reflective mirror 34 disposed in a mirror cashing which is suspended to the hologram scanner housing (not shown). The first reflective mirror 33 is disposed over the hologram scanner 38 and a second reflective mirror 34 is disposed below the first reflective mirror 33, and within the hologram 35 so that the laser beam deflected by the first and second reflective mirrors 33 and 34 is incident upon the axial line X about the central point "A" of the hologram 35.

As the compensating means, a convex lens 39 which has a negative radius of curvature is generally utilized.

The convex lens 39 is disposed such that its focus is located on the drum 11.

As the driving means, a motor 37 is utilized and in this case the rotary disc 36 is fixed to the rotary shaft of the motor 37.

The operation and effect of the present invention will now be described in detail.

When a laser beam 1 is emitted from the laser 31, the laser beam 1 is converted into a parallel beam by the collimator 32, and this parallel beam is incident upon the hologram 35 of the hologram scanner 38 through the reflective mirrors 33 and 34.

The parallel beam is focused by the hologram 35 and at the same time is scanned in the direction of arrow in FIG. 4 according as the hologram scanner 38 is rotated by the drive motor 37.

At this time, the focusing locus of the laser beam focused and scanned by the hologram scanner 38 is formed in a circle, but the compensating convex lens 39 compensates the focusing locus of the laser beam at the drum 11 into a straight line, thereby the spot size and scanning speed of the laser beam formed on the drum 11 become uniform.

After the laser beam scanned by the laser beam scanner according to the picture signal of the computer 24 forms a predetermined picture on the drum 11, conventional printing process is carried out.

As described above in detail, the laser beam scanning system of the present invention has the advantages that the cost becomes low and the size of the whole system becomes miniaturized since the hologram scanner and convex lens are utilized in place of the conventional toric lens and cylindrical lens.

I claim:

1. A laser beam scanning system for a laser printer comprising:
    a laser generating a laser beam;
    a collimator converting said laser beam generated from said laser into a parallel beam;
    a hologram scanner focusing and diffracting said parallel beam, said hologram scanner including at least one hologram cylindrically supported on a rotary disc and a driving means for driving the rotary disc;
   means for deflecting said parallel beam passed through said collimator so as to be incident upon said hologram scanner, said means for deflecting disposed between said collimator and said hologram scanner, said means for deflecting including a first reflective mirror and a second reflective mirror slightly, vertically suspended over said hologram scanner in substantially parallel relationship with each other, wherein said second reflective mirror is disposed below said first reflective mirror and disposed within said hologram so that the parallel beam reflected by the first and second reflective mirrors is incident upon an axial line X based on the center of the hologram;
   means for compensating said laser beam passed through said hologram scanner so as to be scanned straight on a drum; and
    a main reflective mirror deflecting said laser beam passed through the means for compensating so as to be incident upon said drum.

2. The scanning system according to claim 1, wherein said hologram has a circular interference pattern on the surface thereof in a concentric circle.

3. The scanning system according to claim 1, wherein said means for compensating is a compensating convex lens having a negative radius of curvature.

4. The scanning system according to claim 3, wherein the focus of the compensating convex lens is located on said drum.

5. The scanning system according to claim 1, wherein said means for driving is a motor and said rotary disc is fixed to a rotary shaft of said motor.

6. The scanning system according to claim 1, wherein said laser is a laser diode.

* * * * *